United States Patent Office 3,401,953
Patented Sept. 17, 1968

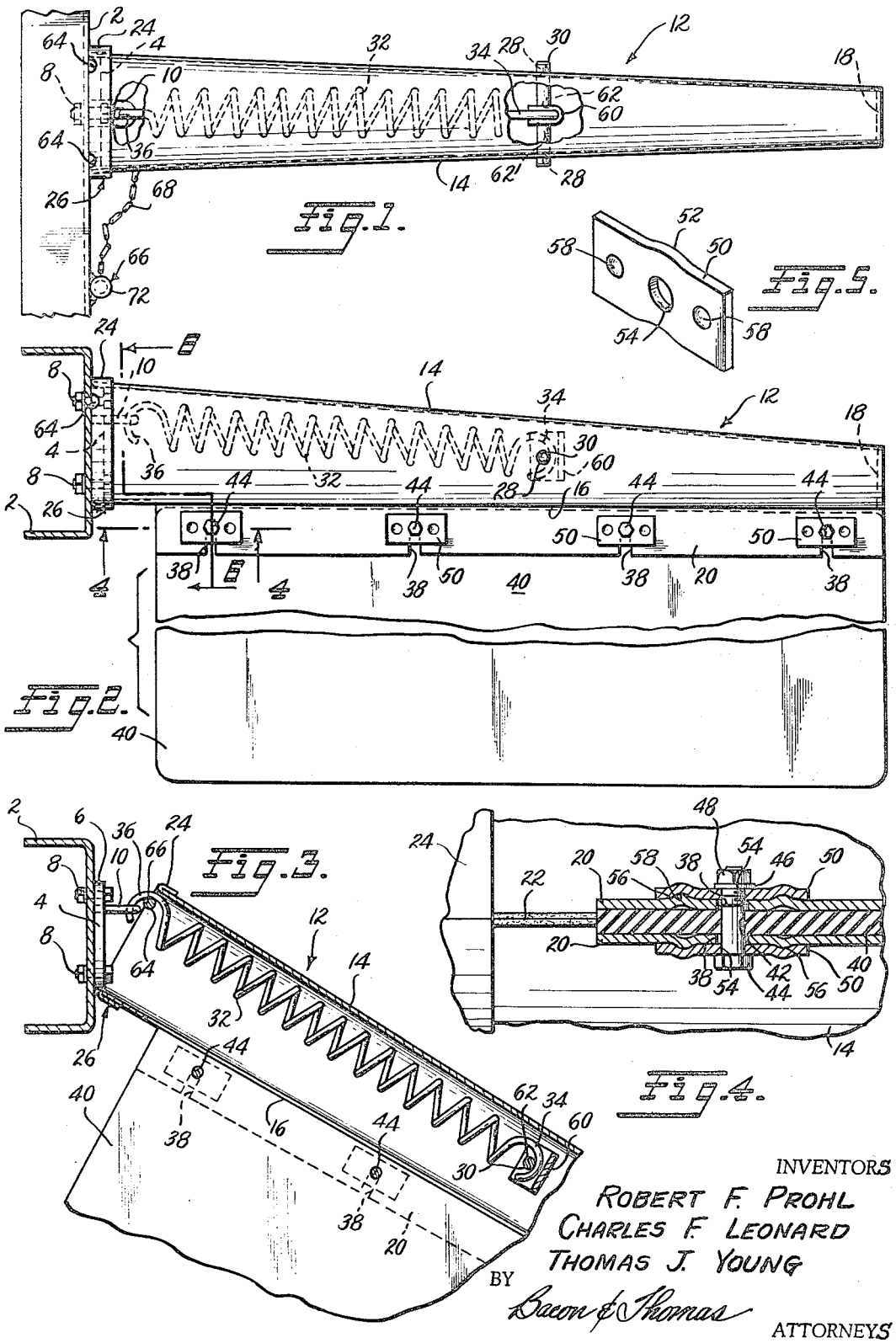

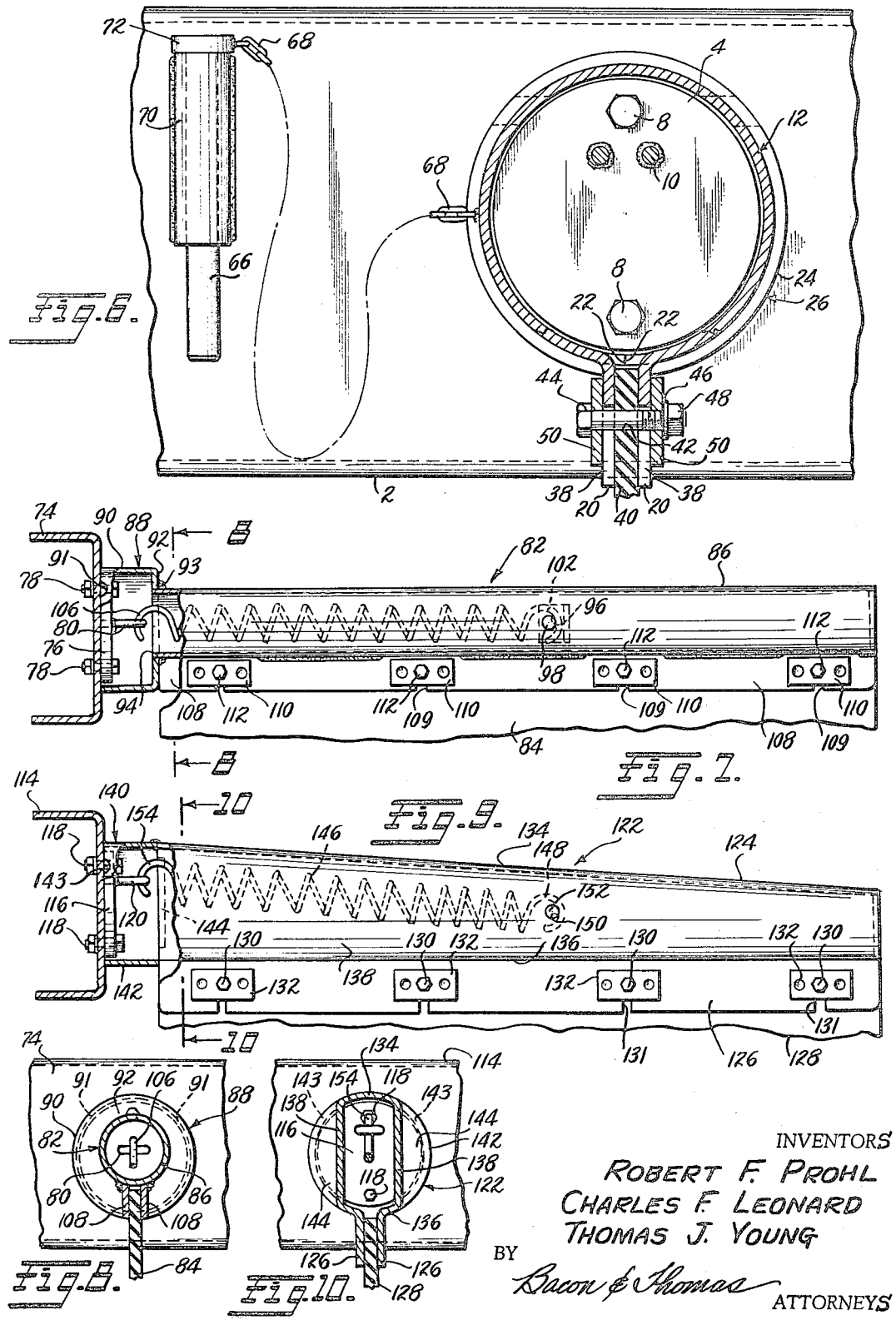

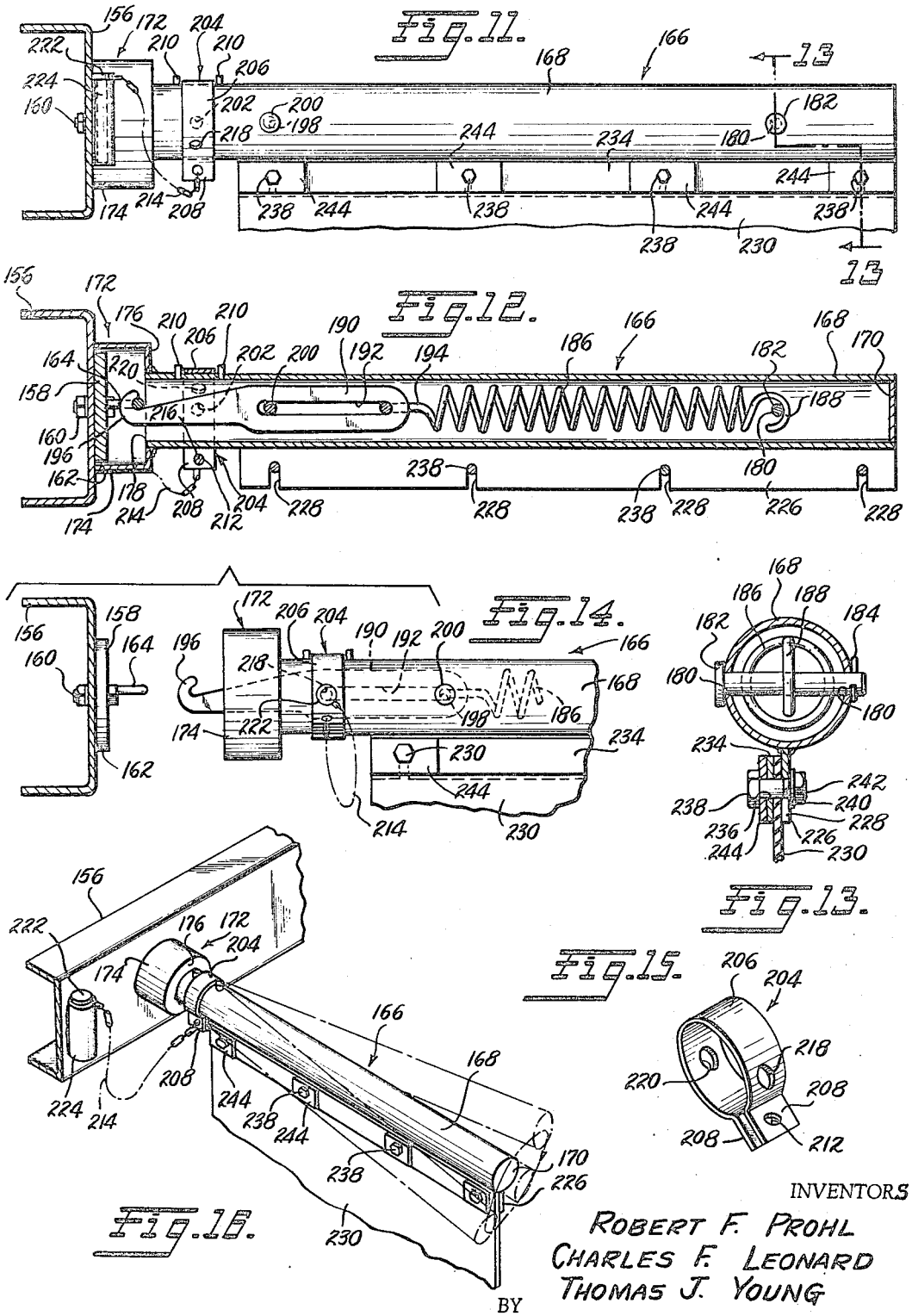

3,401,953
DETACHABLE SUPPORTING ARM ASSEMBLY
FOR MUDFLAPS
Robert F. Prohl and Charles F. Leonard, Boise, and
Thomas J. Young, Meridian, Idaho, assignors to
Pro-Lock Manufacturing Company, Boise, Idaho
Filed June 7, 1965, Ser. No. 461,652
16 Claims. (Cl. 280—154.5)

ABSTRACT OF THE DISCLOSURE

For use on a vehicle, a bracket and a resiliently mounted, universally deflectable, mudflap supporting arm that will automatically be returned to its position after deflection and having a mudflap with resilient attaching means connected with an attaching flange on the support arm designed so that the mudflap will be separated from the support arm instead of damaging the support arm and bracket when an excessive pulling force is applied to the mudflap.

---

This invention relates generally to detachable supporting arm assemblies for motor vehicle wheel mudflaps and the like.

More particularly, the invention relates to improved supporting arm assemblies designed and constructed so that the supporting arm can be deflected in any direction relative to a member upon which the assembly is mounted, and so that it will be automatically returned to its original position after the deflecting force has subsided.

The present mudflap supporting arm assemblies are useful on trucks, trailers and other vehicles designed for travel on and off highways, and normally are mounted behind the dual rear wheels thereof, primarily for the purpose of preventing rocks and other debris from being picked up by wedging between the tires and being hurled rearwardly toward vehicular traffic immediately therebehind.

The principal object of the invention is to provide a supporting arm assembly for motor vehicle mudflaps and the like that is universally deflectable and embodies tensioning means that will yield upon engagement of the arm with an obstruction, and which arm will automatically be returned to its original position after having been deflected.

Another object is to provide a supporting arm assembly for mudflaps and the like wherein all working elements and surfaces thereof are completely enclosed, whereby to prevent malfunctioning due to the entry of dirt, mud, slush and the like thereinto.

A further object is to provide a supporting arm assembly for mudflaps and the like, wherein the supporting arm can be readily mounted upon and readily detached from, its supporting structure.

A still further object is to provide means that will maintain the tensioning element of the supporting arms temporarily distended, to thereby facilitate mounting and demounting thereof.

It is also an object to provide a supporting arm assembly for mudflaps and the like in which the supporting arm is prevented from angularly rotating when in use; wherefore, the mudflap will always hang vertically.

Still another object is to provide an arrangement for securing a mudflap to a supporting arm which will permit the mudflap to separate or pull away from the supporting arm when an excessive pulling force is exerted on the mudflap, without causing damage to either the arm or the mudflap, and which arrangement also provides for ready reassembly of the mudflap with the supporting arm.

Still another object is to provide a supporting arm and base assembly, wherein the base properly positions the supporting arm on the vehicle frame and serves as a fulcrum-abutment during deflecting movement of the arm.

A still further object is to provide means for preventing loss of the supporting arm and mudflap in the event that the arm-tensioning means should fail.

Other objects and many of the attendant advantages of the present invention will become readily apparent from the following detailed description, when considered in connection with the accompanying drawings, wherein:

FIG. 1 is a plan view with portions broken away, showing a preferred embodiment of a supporting arm assembly attached to a vehicle frame member;

FIG. 2 is a side elevational view of the supporting arm assembly of FIG. 1, showing a mudflap attached thereto;

FIG. 3 is a fragmentary vertical cross-sectional view of the supporting arm of FIG. 1, shown inclined downwardly with a keeper pin installed to hold the outer hooked end of a tensioning spring in position for either mounting the arm on or for removing it from the base or mounting plate;

FIG. 4 is an enlarged horizontal sectional view, taken on the line 4—4 of FIG. 2, showing the bolt and resilient washer assembly provided for the "pull-away" attachment of the mudflap to the attachment flanges of the supporting arm;

FIG. 5 is a perspective view of one of the resilient washers in relaxed condition;

FIG. 6 is an enlarged vertical sectional view, taken along the line 6—6 of FIG. 2, showing a circular base plate, the keeper pin, and a holder on the vehicle frame member for receiving the keeper pin when not in use;

FIG. 7 is a fragmentary, partially broken away, side elevational view of another embodiment of the invention;

FIG. 8 is a vertical sectional view, taken on the line 8—8 of FIG. 7;

FIG. 9 is a fragmentary, partially broken away, side elevational view of still another embodiment of the invention;

FIG. 10 is a vertical sectional view, taken along the line 10—10 of FIG. 9;

FIG. 11 is a fragmentary, side elevational view of yet another embodiment of the invention including a novel collar for blocking keeper pin lock holes in the supporting arm;

FIG. 12 is a longitudinal sectional view of the supporting arm assembly of FIG. 11, showing in particular a coil spring and a rigid connecting link for flexibly mounting the arm on its base;

FIG. 13 is a vertical sectional view, taken along the line 13—13 of FIG. 11;

FIG. 14 is a fragmentary side elevational view of the supporting arm assembly of FIG. 11, with the supporting arm disconnected from the circular mounting plate and with the keeper pin in place to hold the hook portion of the rigid connecting link in a projecting position;

FIG. 15 is a perspective view of the collar or lock hole cover shown in FIG. 11; and FIG. 16 is a perspective view of the supporting arm assembly of FIG. 11, showing in phantom lines the manner in which the free end of the supporting arm can be deflected and moved through 360°.

Referring now to the drawings, and in particular to the embodiments of FIGS. 1 to 6, a vehicle frame member is indicated generally at 2 and comprises a channel iron beneath which will be positioned the rear wheels of the vehicle (not shown). A flat, circular mounting plate 4 having a cylindrical rim 6 is secured to the frame member 2 by a pair of spaced, vertically aligned bolts 8, and is positioned rearwardly of the vehicle wheels. Normally, there will be a frame member 2 on each side of the vehicle and a mounting plate 4 will be secured to each.

The mounting plate 4 has a U-shaped eyelet 10 welded to the face thereof, and lying in a generally horizontal plane. The eyelet 10 is preferably positioned vertically directly above the center of the plate 4, a distance equal to about one-half the radius of said mounting plate.

A supporting arm is indicated generally at 12, and includes a hollow body portion 14 having the configuration of a truncated scalene cone, the bottom portion 16 of said cone extending at a right angle to the base thereof. The outer end of the body portion 14 is closed by an end plate 18. The body portion 14 is preferably rolled from sheet material cut at the lateral edges thereof to provide a pair of attachment flanges 20. The flanges 20, as is best shown in FIG. 6, are bent to extend downwardly from the bottom 16 of the body portion 14, and lie parallel to each other. Referring in particular to FIGS. 2 and 3, it will be seen that the attachment flanges 20 terminate a short distance from the base of the body portion 14, and that the edge portions 22 of the sheet from which the body portion 14 is formed meet in the region between the attachment flanges 20 and the base of said body portion.

The base end of the body portion 14 includes a folded back lip 24, and the interior of said base end is made cylindrical to define an annular base flange 26. The base flange 26 has an internal diameter slightly greater than the external diameter of the mounting plate 4, and is receivable thereon. When the annular base flange 26 is fully seated around the cylindrical rim 6 of the mounting plate 4, the supporting arm 12 will extend generally horizontally. At a point about three-fifths of the length thereof, measured from the annular base flange 26, the supporting arm 12 has a pair of horizontally aligned, diametrically opposed openings 28 in the side walls thereof. The opposite ends of an anchor pin 30 are received in the openings 28, and said anchor pin extends transversely across the hollow interior of the body portion 14. The anchor pin 30 will preferably lie in a plane slightly below the center of the mounting plate 4, when the annular base flange 26 is received on said mounting plate and the supporting arm 12 is extending generally horizontally.

Received within the body portion 14 of the supporting arm 12 is a coil spring 32, having a loop 34 on the inner end thereof, which is engaged over the anchor pin 30. The outer end of the coil spring 32 has a loop 36 thereon, which defines a hook that is engageable with the eyelet 10 and which lies in a generally vertical plane. The width of the space between the legs of the U-shaped eyelet 10 is slightly greater than the diameter of the material forming the loop or hook 36, whereby when said loop or hook 36 is received in the eyelet 10 it can swivel universally in any direction relative thereto while at the same time it is constrained by the legs of the eyelet 10 to remain in a generally vertical plane extending substantially at a right angle to the horizontal plane containing said eyelet. The coil spring 32 has a length and strength such that when the hook 36 is engaged with the eyelet 10, the spring will be under tension sufficient to insure that the annular base flange 26 on the supporting arm 12 will remain seated about the circular mounting plate 4 except when a substantial deflecting force is acting on said arm, and so that the supporting arm 12 will return to its original generally horizontal position in the absence of a deflecting force.

As is described hereinabove, if a mudflap is inseparably secured to a supporting arm, it is possible that should the mudflap become caught in a wheel or otherwise have an excessive pulling force applied thereto, it will be torn from the arm, or the arm broken off, thus causing damage to either or both the mudflap and the supporting arm. In the present invention, means has been provided to secure a mudflap to the attachment flanges 20 in such a manner that when an excessive pulling force is applied thereto, the mudflap can pull away or separate from the supporting arm 12, without causing damage either to said arm or to said mudflap.

To this end, the attachment flanges 20 have spaced, downwardly opening notches 38 therein, the notches 38 on one flange 20 being aligned with corresponding notches on the other flange 20. Received between the attachment flanges 20 is the upper end of a mudflap 40, said mudflap having holes 42 therethrough, one for each aligned pair of notches 38. Bolts 44 extend through the holes 42, and have lock washers 46 and nuts 48 thereon.

The bolts 44 are inserted into the notches 38, and two resilient washers 50 are received on each bolt 44, one washer 50 being engaged with the outer surface of each attachment flange 20. One of the resilient washers 50 is shown in relaxed condition in FIG. 5 and comprises a rectangular piece of resilient metal or other suitable material having a centrally positioned, transversely extending arcuate bend 52 therein, the washer being provided with an opening 54 centrally of said arcuate bend 52 for receiving the bolt 44.

Each attachment flange 20 has pairs of detents 56 formed on the outer surface thereof, one detent 56 being positioned on either side of each of the notches 38. The detents 56 have the configuration of a segment of a sphere, and the inner faces of the washers 50 have correspondingly shaped recesses 58 therein within which the detents 56 can seat to form a ball and socket joint. Referring to FIGS. 2 and 4, the resilient washers 50 are positioned so that the detents 56 on the attachment flanges 20 are received within the recess 58, and the nuts 48 are then drawn up on the bolts 44 until the washers 50 lie generally flat and engage the attachment flanges 20. When the nuts 48 have been thus tightened, the mudflap 40 is secured to the attachment flanges 20 by the grip of the resilient washers 50 on the external surfaces of the detachment flanges 20; the washers 50, the notched attachment flanges 20, the detents 56 and the recesses 58 cooperating to adequately fasten the mudflap 40 to the supporting arm 12 under normal operating conditions.

If the mudflap 40 should become entangled in the vehicle wheels, or get caught or wedged on an object in its path, and an excessive pull is exerted thereon, the upper edge thereof will separate or be pulled away from the attachment flanges 20, carrying the bolts 44 and the washers 50 therewith. This is made possible by the resiliency of the washers 50, and by the rounded detents 56 and their cooperating rounded recesses 58. Thus, no damage will occur to either the supporting arm 12 or to the mudflap 40. The mudflap 40 can, of course, be readily reinstalled merely by loosening the nuts 48 sufficiently to permit the washers 50 to be positioned in their original locations on the attachment flanges 20, and then retightened.

As has been described hereinabove, the eyelet 10 and the hook 36 on the coil spring 32 are shaped and proportioned so that they will remain at substantially right angles relative to each other. However, the hook 34 on the inner end of the spring 32, in the absence of a restraining member, would be free to twist on the anchor pin 30 in the direction of the longitudinal axis of said anchor pin. To prevent such movement, and to thereby prevent the supporting arm 12 from revolving relative to the mounting plate 4, a clip 60 (FIG. 1) is provided. The clip 60 is generally U-shaped, and has aligned openings 62 in the legs thereof for receiving the anchor pin 30. The legs of the U-shaped clip 60 are spaced apart a distance slightly greater than the width of the hook 34, and said clip 60 is mounted on the anchor pin 30 so that the hook 34 is disposed between the legs thereof. The legs of the clip 60 thus confine the hook 34 and prevent said hook from twisting in either direction on the anchor pin 30.

The supporting arm 12 can be easily attached to and removed from the mounting plate 4, provided that the hook 36 is held in a position wherein it projects forwardly beyond the annular base flange 26, and the present device is constructed so that it can do so. Thus, the end face of the base flange 26 has a pair of horizontally aligned, arcuate notches 64 therein, adjacent the top portion of said base flange. The notches 64 function as seats for receiving a keeper pin 66, which pin during installation and removal of the supporting arm 12 is engaged within the hook 36 of the coil spring 32. When said hook 36 is engaged with the keeper pin 66, said pin will be held in position within the notches 64 by the tensioned coil spring 32.

The manner in which the supporting arm 12 is installed on the circular mounting plate 4 is best illustrated by reference to FIG. 3, wherein said arm 12 is shown with the keeper pin 66 in position to hold the hook 36 so that it projects outwardly from the base flange 26. With the hook 36 thus held, it is relatively easy to engage said hook in the eyelet 10, after which the lower part of the base flange 26 is engaged over the lower edge of the mounting plate 4 and with the adjacent portion of the frame member 2. A fulcrum point is thus established, so that by tilting the supporting arm 12 downwardly, the spring 32 is extended and the keeper pin 66 is freed so that it can be removed from the notches 64 and withdrawn from the hook 36. Upon release of the supporting arm 12, the spring 32 will rock it upwardly so that the annular base flange 26 will enclose the mounting plate 4 and seat fully against the frame member 2. The supporting arm 12 will assume the horizontal position of FIG. 2. Removal of the supporting arm 12 is accomplished by reversing the above procedure.

The keeper pin 66 has one end of a chain 68 welded thereto, the opposite end of said chain being welded to the supporting arm 12. The frame member 2 has a vertically disposed cylindrical holder 70 welded thereto, for reception of the keeper pin 66, and the keeper pin 66 has an enlarged head 72 thereon of a diameter substantially larger than the internal diameter of said holder 70. After the keeper pin 66 has been removed from the notches 64 during mounting of the supporting arm 12 on the circular mounting plate 4, the pin 66 is inserted into the holder 70. Thereafter, the keeper pin 66 and the chain 68 function as a safety apparatus to prevent loss of the supporting arm 12 in the event the coil spring 32 or the eyelet 10, or some other element of the supporting arm assembly, should fail.

When the supporting arm 12 is assembled on the mounting plate 4, as shown in FIGS. 1, 2 and 6, said arm can be deflected in any direction and will automatically return to its original position after the deflecting force has terminated. This universal movement, which is highly desirable, is obtained because of the circular configurations of the mounting plate 4 and the annular base flange 26 received thereon. The clip 60 and the mating configurations of the hook 36 and the eyelet 10 all cooperate, as described above, to prevent revolving of the supporting arm 12 during use thereof, so that the mudflap 40 always hangs vertically.

As has been described hereinabove, a mudflap assembly on a truck, especially on a truck operating in the field or on unsurfaced roads, is subject to being sprayed by mud, slush and the like. In the present invention, the rim 6 and the face of the mounting plate 4, the interior of the base flange 26, the eyelet 10, the hook 36, the coil spring 32, and the anchor pin 30 and the clip 60 are all enclosed so that mud and slush cannot impinge thereon. Thus, all of the working surfaces and elements of the invention will remain clean at all times, so that their operation will not be impaired by dirt or the like.

The most common deflecting force encountered by a mudflap supporting arm is that which would deflect the arm in a downward direction. Thus, the supporting arm assembly of the invention is designed so that the maximum recovery force; i.e., that force which restores the supporting arm 12 to its original generally horizontal position after it has been deflected, will be exerted when the arm 12 is deflected downwardly.

As has been described, the eyelet 10 is positioned substantially above the center of the mounting plate 4, and the anchor pin 30 is positioned in a plane below the center of said mounting plate. This arrangement causes the coil spring 32 to extend upwardly at an angle to the horizontal, the result of which is that when the supporting arm 12 is deflected downwardly, a substantially greater restoring force will be exerted thereon than would be the case if the eyelet 10 were centered on the circular mounting plate 4 and the anchor pin 30 were in line with said mounting plate center. Of course, the described arrangement results in a somewhat reduced restoring force being exerted on the supporting arm 12 when it is deflected upwardly, but it should be noted that in such instances, the weight of the supporting arm 12 and of the mudflap 40 will function by gravity to augment the force of spring 32 to restore the supporting arm 12 to its original position.

Referring now to FIGS. 7 and 8, a modified embodiment of the invention is shown wherein a vehicle frame member is indicated generally at 74, and has a circular mounting plate 76 secured thereto by vertically spaced bolts 78. The plate 76 is identical to the circular mounting plate 4 and has an eyelet 80 secured thereto a short distance above the center thereof, and a supporting arm 82 is secured to said circular mounting plate 76 and has a mudflap 84 attached thereto.

The supporting arm 82 includes a body comprising a piece of a cylindrical pipe or tube 86, one end of which is attached to a cup-shaped base member 88. The base member 88 includes a cylindrical, annular base flange 90, having an end plate 92 formed integrally therewith. The end plate 92 has a bore 94 aligned with the eyelet 80, within which the end of the tubular body 86 is received and welded at 93.

The tubular body 86 has a pair of horizontally aligned, diametrically opposed openings 96 within which are received the opposite ends of an anchor pin 98. A coil spring 100 is received in the tubular body 86 and has a hook 102 on the inner end thereof which is hooked over the anchor pin 98. A U-shaped clip 104, identical to the clip 60, is received on the anchor pin 98, and the legs thereof embrace the opposite sides of the hook 102 to restrain the supporting arm 82 from angular rotation. The outer end of the spring 100 has a hook 106 thereon designed to be engageable with the eyelet 80 in the same manner that the hook 36 engages the eyelet 10.

The tubular body 86 has a pair of downwardly extending spaced parallel attachment flanges 108 (FIG. 8) welded thereto, between which is received the upper end of the mudflap 84. The mudflap is secured to the flanges 108 on the supporting arm 82 by resilient washers 110 and bolts 112, which are identical to the washers 50 and bolts 44. The flanges 108 have downwardly opening notches 109 therein which correspond to the notches 38. The structure for detachably securing the mudflap 84 to the supporting arm 82 is thus substantially identical to that described hereinabove with reference to FIGS. 1–6, and functions in the same manner. The end face of the circular base flange 90 has horizontally aligned recesses 91 therein, corresponding to the recesses 64, for receiving a keeper pin to hold the hook 106 in a projecting position. The arm 82 is mounted and removed in the same manner as the supporting arm 12.

Referring to FIGS. 9 and 10, another embodiment of the invention is shown, which eliminates the use of the clips 60 and 104 to restrain the supporting arm 122 from angular rotation. A vehicle frame member is indicated generally at 114, and has a mounting plate 116 secured thereto by vertically aligned bolts 118, said mounting plate being identical to the mounting plates 4 and 76 and having an eyelet 120 secured thereto directly above the center thereof.

The supporting arm 122 of FIGS. 9 and 10 includes a body portion 124, having, in side elevation, the general configuration of a truncated right triangle, with the long side of said triangle extending horizontally to define the bottom of said supporting arm. The supporting arm 122 includes downward extensions in the form of spaced, parallel attachment flanges 126 along the lower edge thereof, between which is received the upper end of a mudflap 128. The mudflap 128 is secured to the flanges 126 by bolts 130, received in notches 131 in said flanges, and resilient washers 132, the latter being identical to the resilient washers 50. This securing structure functions in the same break-away manner as described hereinabove with reference to FIGS. 1–6.

The body portion 124 of the supporting arm 122 has a generally rounded top 134 and a like-shaped bottom portion 136, interconnected by a pair of vertically extending, parallel side walls 138 (FIG. 10). Attached to the base end of the body portion 124 is a cylindrical member 140, which defines an annular base flange 142 having an internal diameter slightly greater than the diameter of the circular mounting plate 116, on which it is receivable. The base end of the supporting arm 122 is welded to the base flange 142, and segmental filler plates 144 are welded to said base flange and to the side walls 138 on either side of said side walls.

Received within the supporting arm 122 is a coil spring 146 having a hook 148 on the inner end thereof. The vertical side walls 138 of the supporting arm 122 have horizontally aligned openings 150 therein, positioned from the base flange 142 a distance equal to about three-fifths of the length of the arm body portion 124. The openings 150 lie in a plane slightly below the center of the mounting plate 116 and have the opposite ends of an anchor pin 152 received therein, and over which the hook 148 is engaged. The outer end of the spring 146 has a hook 154 on the end thereof engaged with the eyelet 120 in the same manner that the hook 36 is engaged with the eyelet 10.

Because of the arrangement of the anchor pin 152 and the eyelet 120, the spring 146 will extend upwardly at an angle from said anchor pin to the eyelet 120. The vertically disposed, parallel side walls 138 are spaced a disstance which is slightly greater than the maximum diameter of the coils of the spring 146, with the result that the upward inclination of the spring 116 will cause it to engage said side walls if a force is exerted on the supporting arm 122 urging it to rotate about the mounting plate 116. Such engagement of the spring 146 with the side walls 138 effectively restrains the supporting arm 122 from revolving about the circular mounting plate 116, thereby assuring that the mudflap 128 will remain in a vertical position.

The supporting arm 122 is mounted and removed in the same manner as the supporting arms 12 and 82, the annular base flange 142 having horizontally aligned notches 143 therein for receiving a keeper pin (not shown), which keeper pin is utilized as above described to hold the hook 154 in a projecting position.

In the three embodiments of the invention thus far described, the outer end of the coil spring is directly connected with the eyelet on the circular mounting plate. Another embodiment of the invention is shown in FIGS. 11–16, wherein a rigid connecting link is attached to the outer end of the coil spring and has a hook on its outer end for connecting it with the eyelet on a mounting plate.

Referring to FIGS. 11–16, a vehicle frame member is indicated at 156, and has a circular mounting plate 158 secured thereto by a pair of spaced, horizontally aligned bolts 160. The mounting plate 158 includes a cylindrical rim 162, and has a U-shaped eyelet 164 secured thereto, the legs of said eyelet lying in a horizontal plane. A supporting arm is indicated generally at 166 and includes a tubular body portion 168 closed at its outer end by a circular end plate 170, and attached at its inner end to a base member 172. The base member 172 includes an annular flange 174 of a size to be received over the mounting plate 158, and an end plate 176 having a bore 178 therethrough within which is received and welded the base end of the tubular body 168.

The body 168 has a pair of horizontally aligned, confronting openings 180 in the side walls thereof positioned near the outer end of said body. A headed anchor pin 182 is received within the openings 180, and is secured in position by a cotter pin 184. A coil spring 186 is received within the body 168, and includes a hook 188 on the inner end thereof which is engaged over the anchor pin 182. A rigid connecting link 190 is also received within the elongated body 168, and has a longitudinally extending slot 192 therein. The coil spring 186 has a hook 194 on the outer end thereof, which lies at a right angle to the vertical plane containing the hook 188. The hook 194 is received in the inner end of the slot 192 for connecting the coil spring 186 to the link 190. The link 190 includes an upturned hook 196 on the outer end thereof, which is engageable with the U-shaped eyelet 164. The width of the space between the legs of the U-shaped eyelet 164 is slightly greater than the thickness of the link 190; wherefore, said link is held at substantially a right angle to the plane of the eyelet, while at the same time, the arm 166 is permitted to move universally to the desired extent.

The body 168 has a second pair of confronting, horizontally aligned openings 198 therein, positioned to confront the slot 192. A headed guide pin 200 passes through the openings 198, and also passes through the horizontal slot 192 and guides the rigid link 190 in its movement. The pin 200 has a diameter only slightly less than the width of the slot 192, whereby the rigid link 190 is restrained to remain at a 90° angle to the axis of the guide pin 200; this relation prevents the cylindrical body 168 from revolving relative to the rigid link 190. The spring 186 and the slot 192 are so dimensioned that when the rigid link 190 is extended beyond the annular base flange 174 to expose the hook 196 (FIG. 14), the guide pin 200 will be disposed near the inner end of the slot 192. Further, the slot 192 is of sufficient length so that when the base flange 174 is received on the mounting plate 158 and seated against the frame member 156, the guide pin 200 will not be in contact with the outer end of said slot (FIG. 12).

Midway between the openings 198 and the end plate 176, the elongated body 168 has another pair of horizontally aligned, confronting openings 202. A locking hole cover 204 is mounted on the cylindrical body 168 in the region of the openings 202, and includes a cylindrical collar 206 having a pair of outwardly bent flanges 208 that serve as a weight. The collar 206 is restrained against axial sliding on the body 168 by a pair of pins 210 secured to said body. The collar is normally free to revolve upon the body so that the weight of the flanges 208 will cause the collar to rotate into a position wherein said flanges are directed downwardly.

The flanges 208 have aligned openings 212 therethrough, and one end of chain 214 is secured between said flanges by a pin 216. The collar 206 has a pair of diametrically opposed openings 218 and 220 therein, the opening 218 being disposed adjacent one of the flanges 208, and the opening 220 being spaced circumferentially a substantial distance from the other of said flanges. Wherefore, when the collar 206 is disposed with the flanges 208 pointing downwardly, as in FIGS. 11, 12 and 16, the openings 218 and 220 will be out of alignment with the openings 202. However, by rotating the collar 206 through several degrees, the openings 218 and 220 can be brought into alignment with the openings 202.

The other end of the chain 214 is secured to a headed keeper pin 222, which is receivable through the openings 218 and 220, and the openings 202, as well as the slot 192. The keeper pin 222 functions in the same manner as the keeper pin 66, in that it will maintain the rigid link 190 in a position wherein the hooked outer end 196 thereof projects beyond the annular base flange 174, as is shown in FIG. 14.

Prior to installation, the hooked end 196 of the rigid link 190 is disposed to project outwardly from the annular base flange 174, and the keeper pin 222 is inserted through the openings 218 and 220, the openings 202, and the slot 192. The supporting arm 166 is then connected to the eyelet 164, in a manner similar to that described hereinabove, and the keeper pin 222 is then removed, The coil spring 186 now is free to contract, thereby holding the annular base flange 174 in position over the circular mounting plate 158 and in engagement with the frame member 156. When the keeper pin 222 is withdrawn from the openings 218 and 220, the collar 206 is caused to rotate through gravity by the weight of the flanges 208 until said flanges are pointing downwardly. In such position, the openings 202 are covered by the collar 206 to prevent dirt and other foreign matter from entering into the body 168 through said openings.

The vehicle frame member 156 has a vertical sleeve 224 welded thereto, in which the pin 222 is disposed when it is not in use to hold the rigid link 190 in an extended position. When the keeper pin 222 is received in the sleeve 224, it functions together with the chain 214 as a safety device for retaining the supporting arm 166, should the coil spring 186 or some other component fail.

The cylindrical body 168 has a single attachment flange 226 (FIG. 13) welded to project downwardly therefrom, said flange having a plurality of downwardly opening notches 228 therein. A mudflap 230, having holes 232 through the upper end thereof, is connected to the attachment flange 226, said mudflap having an elongated metallic bar 234 at the upper edge thereof containing holes 236 aligned with the holes 232. Bolts 238 pass through the holes 236 and 232 and are received in the notches 228, said bolts having lock washers 240 and nuts 242 thereon. Positioned between the heads of the bolts 238 and the elongated bar 234 are resilient washers 244, similar in construction to the resilient washers 50. The mudflap 230 is thus mounted in a manner similar to the mudflaps 40, 84 and 128, so that if an excessive pulling force is exerted thereon, it can pull away from the supporting arm 166.

While the eyelet 164 is shown centrally positioned on the mounting plate 158, it is to be understood that, in accordance with the teachings of FIGS. 1–10, it can be mounted in a position vertically above the center of said plate. In such instance, of course, the cylindrical body 168 would need to be mounted in alignment with the eyelet.

It is again emphasized that because of the circular mounting plate and the enclosing annular base flange, the supporting arm in all embodiments of the invention disclosed herein can be deflected in any direction, and that upon discontinuance of the deflecting force the arm will automatically return to its original horizontal position. Further, while the supporting arm of the different embodiments are in deflected positions, their outer end can be rotated through 360°. This feature is illustrated diagrammatically in FIG. 16, and minimizes the possibility of damage to the supporting arm structure regardless of the direction in which a foreign object strikes the supporting arm.

It should also be noted that in all of the embodiments of the invention, the coil spring, the inner cylindrical surface of the annular flange, the rim and face of the mounting plate, and the eyelet are sealed from dirt, mud and other foreign matter, whereby the operation of the supporting arm cannot be affected thereby. Further, it is evident that the supporting arm of the invention can be readily mounted and dismounted with a minimum of effort, and that the supporting arms of each embodiment are readily interchangeable.

Obviously, many modifications and variations of the present invention are possible in the light of the above teachings. It is, therefore, to be understood that, within the scope of the appended claims, the invention may be practiced otherwise than as specifically illustrated and described.

We claim:

1. A universally deflectable supporting arm assembly for mudflaps and the like, including: a circular mounting plate having flat sides; anchor means secured to said plate and extending from one side of said plate; an elongated hollow supporting arm having an annular flange at one end thereof, said flange having an internal diameter slightly larger than the diameter of said plate being receivable over said plate; and resilient means disposed within said supporting arm, said resilient means including hook means on the outer end thereof detachably engageable with said anchor means; means connecting the other end of said resilient means with said supporting arm, and means engageable with said resilient means arranged to restrain said supporting arm from revolving about said resilient means when said base flange is received over the mounting plate and when said hook means is engaged with said anchor means.

2. A supporting arm assembly as recited in claim 1, wherein said resilient means includes: a coil spring, the inner end of which is connected with the supporting arm, and wherein the hook means comprises a rigid connecting link having a hook on the outer end thereof which is detachably engageable with the anchor means, the inner end of said link being connected with the outer end of said coil spring.

3. A supporting arm assembly as recited in claim 1, wherein the resilient means comprises a coil spring having loops at the opposite ends thereof, the loop at the inner end of said spring being connected with the supporting arm, and the loop at the outer end of said spring constituting the hook means.

4. A supporting arm assembly as recited in claim 1, including additionally: at least one longitudinally extending, downwardly directed attachment flange on said supporting arm, said attachment flange having a plurality of downwardly opening notches therein; a mudflap, said mudflap having a plurality of openings therethrough at the upper end thereof, one aligned with each of said notches; and resilient securing means received in said notches and extending through said openings, and being engageable with said attachment flange to detachably secure said mudflap to said supporting arm, said notches and resilient securing means providing for separation of said mudflap from said supporting arm without damaging said resiliently mounted supporting arm and mounting plate when an excessive pulling force is applied to said mudflap.

5. A supporting arm assembly as recited in claim 4, wherein the resilient securing means includes: a bolt receivable through the aligned openings and notches; and at least one resilient washer on each bolt, disposed to urge the attachment flange and mudflap toward each other.

6. A universally deflectable supporting arm assembly for mudflaps and the like, including: a circular mounting plate having flat sides; eyelet means secured to said plate and extending from one side of said plate; an elongated hollow supporting arm having an annular base flange at one end thereof, said flange having an internal diameter slightly larger than the diameter of said plate and being receivable over said plate; a coil spring received within said supporting arm and having a loop on each end thereof, the loop on the outer end of said spring defining a hook engaged with said eyelet means; means anchoring the loop on the inner end of said spring to said supporting arm; and means engageable with said spring for restraining said supporting arm against rotating about its axis when said hook is engaged with said eyelet means and said base flange is received over said plate.

7. A supporting arm assembly as recited in claim 6, wherein the eyelet means is positioned a substantial distance radially from the center of the circular mounting plate.

8. A supporting arm assembly as recited in claim 6, wherein the supporting arm has opposed side walls and a pair of confronting bores in said side walls, and wherein the inner end of the spring is anchored to said supporting arm by a pin extending through the loop on the inner end of said spring and having its opposite ends received in said confronting bores, and wherein the restraining means comprises: a U-shaped clip having legs with aligned bores, said clip being received on said pin, and the confronting faces on the legs of said clip being disposed on opposite sides of, and immediately adjacent to said loop on said inner end of the spring.

9. A supporting arm assembly as recited in claim 6, wherein the eyelet means is positioned a substantial distance radially above the center of said mounting plate, and wherein the spring is arranged to extend at an angle to the horizontal when the hook is engaged with said eyelet means and the annular flange is received over said mounting plate, and wherein the restraining means comprises: a pair of vertical, parallel walls on the supporting arm, spaced apart a distance slightly greater than the maximum diameter of said spring, said spring being received between said parallel walls, and said walls extending for a substantial portion of the length of said spring.

10. A supporting arm assembly as recited in claim 6, wherein the end face of the base flange has a pair of aligned notches therein, and wherein a keeper pin extends through said hook and into said notches.

11. A supporting arm assembly as recited in claim 6, including at least one longitudinally extending, downwardly projecting attachment flange on said supporting arm; a mudflap; and means for detachably connecting said mudflap to said attachment flange, arranged and constructed so that when excessive pull is exerted on said mudflap, it will disengage from said attachment flange without damage to said attachment flange, said mudflap, and said connecting means.

12. A deflectable supporting arm assembly for mudflaps and the like, including: a circular mounting plate having flat sides; eyelet means secured to said plate and extending from one side of said plate; an elongated hollow supporting arm having an annular end with an internal diameter slightly larger than the diameter of said plate and being receivable over said plate; a spring within said supporting arm; means anchoring the inner end of said spring to said arm; a rigid connecting link also received within said supporting arm and connected at its inner end with the outer end of said spring, said rigid link having an elongated slot therein, and having a hook on the outer end thereof engaged with said eyelet means; and a guide pin carried by said supporting arm and extending transversely thereof and passing through said slot.

13. A supporting arm assembly as recited in claim 12, wherein the supporting arm includes diametrically opposed side wall portions and has a pair of confronting bores in said side wall portions between the guide pin and the annular flange, and positioned to be in alignment with the outer end of said slot when the connecting link is moved outwardly agaist the force of said spring a distance sufficient so that said hook projects beyond said annular flange; and a keeper pin insertable through said bores and through said slot to retain said hook in said projecting position.

14. A supporting arm assembly as recited in claim 13, wherein the confronting bores are aligned on a generally horizontal axis, and including additionally, a cylindrical collar received on the supporting arm over said confronting bores, said collar being weighted at one point on its periphery, whereby said collar when unrestrained will be rotated by gravity about a horizontal axis so that said weighted point will be lowermost, said collar further having a pair of diametrically aligned bores extending therethrough for receiving said keeper pin, one of said bores being substantially closer to said weighted point than the other.

15. A universally deflectable supporting arm assembly for mounting mudflaps and the like on a frame member, including: a circular mounting plate to be attached to said frame member; eyelet means secured to said plate and extending from one face of said plate; an elongated hollow supporting arm having an annular base flange at one end thereof, said flange having an internal diameter slightly larger than the diameter of said plate and being receivable over said plate; resilient means disposed within said supporting arm, said resilient means including hook means on the outer end thereof arranged to be detachably engaged with said eyelet means; means anchoring the other end of said resilient means to said supporting arm; means engageable with said resilient means arranged to restrain said supporting arm from revolving about said resilient means when said base flange is received over the mounting plate and when said hook means is engaged with said eyelet means; means including a keeper pin for releasably holding said resilient means extended during mounting of said supporting arm on, and during dismounting thereof from, said circular plate so that said hook means projects beyond said base flange; flexible means connecting said keeper pin to said supporting arm; and means for storing said keeper pin when not in use.

16. A supporting arm and mudflap assembly, comprising: an elongated supporting arm having at least one longitudinally extending, downwardly directed attachment flange, said attachment flange having a plurality of downwardly opening notches therein; a mudflap, said mudflap having a plurality of openings therethrough at the upper end thereof, one aligned with each of said notches, whereby said flange and mudflap have confronting faces; and resilient securing means received in said notches and extending through said openings, and engaged with said attachment flange detachably securing said mudflap to said supporting arm, said resilient securing means including: a bolt received in and extending through the aligned openings and notches; and at least one resilient washer on said bolt, disposed to urge the confronting faces of said attachment flange and said mudflap toward each other, said resilient washer engaging the attachment flange, and said attachment flange and said resilient washer having interengaged detent and recess means thereon.

References Cited

UNITED STATES PATENTS

| | | | |
|---|---|---|---|
| 2,098,388 | 11/1937 | Hruska | 248—160 |
| 2,652,266 | 9/1953 | Miller | 280—154.5 |
| 2,978,217 | 4/1961 | Gunderson | 248—204 |
| 3,158,386 | 11/1964 | Tillinghast et al. | 280—154.5 |
| 3,219,363 | 11/1965 | Dalsey et al. | 280—154.5 |
| 2,801,867 | 8/1957 | Childreth | 280—154.5 |

BENJAMIN HERSH, *Primary Examiner.*

L. D. MORRIS, *Assistant Examiner.*